Patented May 31, 1932

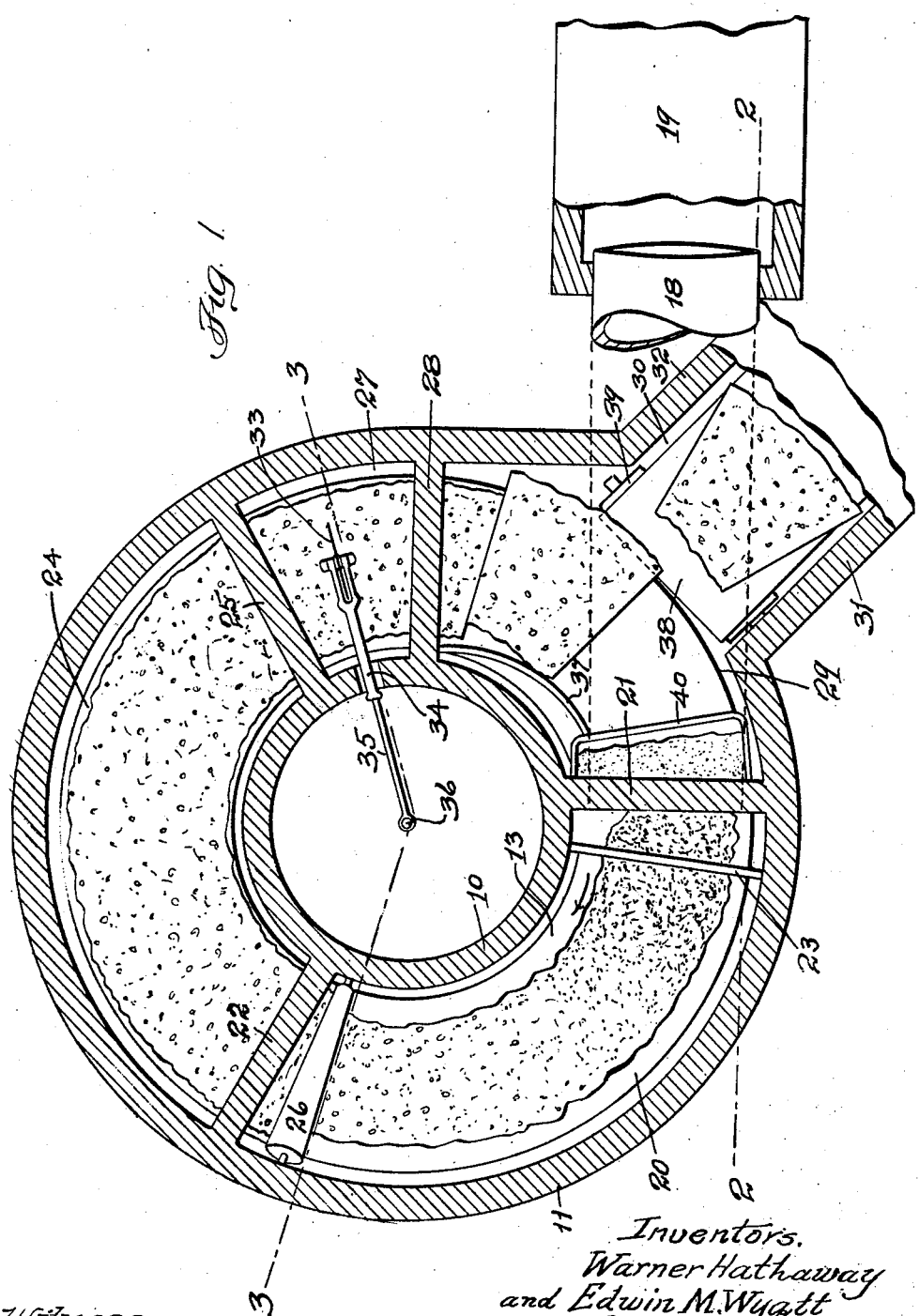

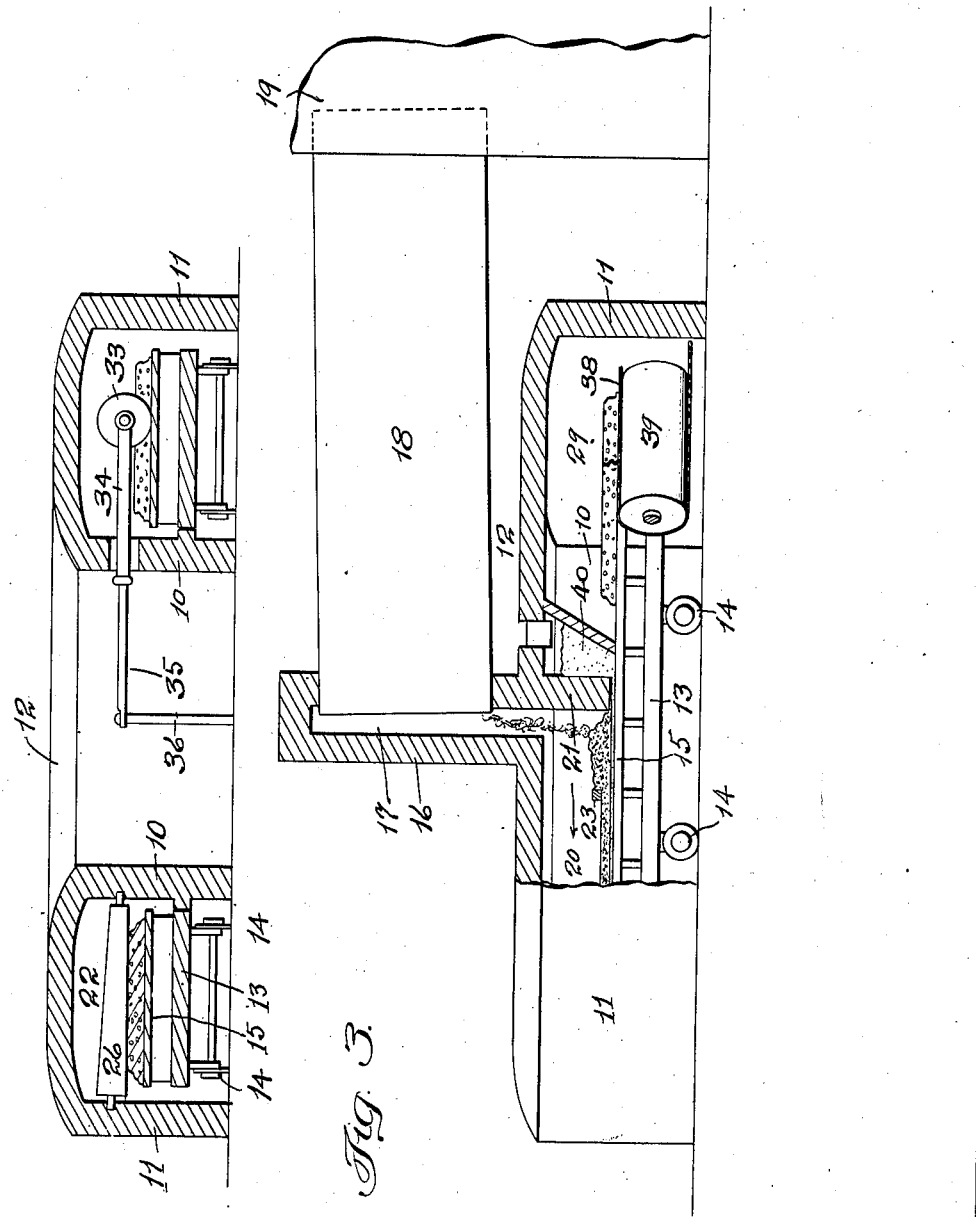

1,860,739

UNITED STATES PATENT OFFICE

WARNER HATHAWAY, OF MADISON, WISCONSIN, AND EDWIN M. WYATT, OF CLEVELAND, OHIO, ASSIGNORS, BY MESNE ASSIGNMENTS, TO AMERICAN FACE BRICK RESEARCH CORPORATION, A CORPORATION OF ILLINOIS

KILN FOR THE PRODUCTION OF CELLULAR BUILDING MATERIAL

Application filed October 28, 1929. Serial No. 402,900.

This invention relates to a kiln designed for the manufacture by a bloating process of the cellular building material set forth in co-pending application, Serial No. 382,358, filed July 31, 1929, for cellular building material.

The production of the building material in question involves the feeding of granular argillaceous materials, of the character ordinarily used in brick making, to a bloating chamber maintained at a temperature adequate to cause the partial fusion and liquefaction of the materials and to cause the gas producing constituents to evolve gases within the interior of the mass, which causes an expansion or bloating thereof and the formation of minute cells separated by walls of vitreous material.

It is desirable, in the carrying out of such a process, to preheat the granular material under agitation to a temperature of approximately 1700° F. prior to its introduction, while still in granular form, into the bloating chamber, wherein temperatures ranging from 2000° to 2300° F. are maintained. As the granular material is deposited within the bloating chamber, it is leveled down to a layer of the intended thickness, and is subjected to a temperature which first causes a skinning over of the surface and thereafter causes the formation of gases within the interior, which bloat the mass and cause it to swell to from two to three times its original thickness.

After the layer of material has traversed the bloating chamber, it is introduced into a chamber, or chambers, where substantially lower temperatures are maintained, and is allowed to cool and harden, and is ultimately introduced into an annealing chamber, where it is annealed for a considerable period to prevent fracturing due to sudden cooling. At a suitable stage in the progress of the material, to the point of final delivery, the slab of material which is continuously formed within the bloating chamber is cut into units of the desired dimensions.

The kiln of the present invention is designed to conform to the requirements of the above described process, and to make provision for the continuous feeding, bloating, cutting and cooling of the material, which in the present instance is given a circular movement by the employment of a rotary turntable, which affords the conveyor upon which the granular material is initially deposited and from which it is removed after bloating.

The invention is further designed with a view to the conservation of heat and to the employment of the products of combustion discharged from the bloating chamber, as a means for heating the rotary preheater from which the products of combustion are ultimately discharged to a stack.

Further objects and details of the invention will appear from a description thereof, in conjunction with the accompanying drawings, wherein,—

Figure 1 is a sectional plan view of the kiln with the annealing chamber broken away;

Fig. 2 is a view partly in section, taken on line 2—2 of Fig. 1; and

Fig. 3 is a cross sectional elevation, taken on line 3—3 of Fig. 1.

The kiln as a whole is in the form of a circular structure comprising an inner circular wall 10, an outer circular wall 11, and a ring-shaped roof 12, giving to the structure as a whole the formation of a circular tunnel surrounding an open center space.

Within the circular tunnel thus provided is mounted a ring-shaped endless conveyor 13 in the form of a turntable, which is mounted upon truck wheels 14 and is rotated at a slow rate of speed by any suitable or adequate means, not shown.

The upper deck 15 of the turntable is of ring-shaped formation, and is composed of slabs or plates of refractory material, in order to resist the high temperatures to which the deck surface of the turntable is exposed.

At one side of the structure, the roof is built up to afford a super-structure 16, which forms a vertical chute 17 into which projects the lower end of an inclined rotary kiln 18 rotated by any suitable and adequate means, and the outer end of the rotary kiln projects into the interior of a stack 19.

Immediately in advance of the point of delivery for the material is a bloating chamber 20, the rear end of which is defined by a radial cross wall 21, and the forward end of which is defined by a radial cross wall 22, as shown. The cross walls 21 and 22 are separated by a distance equal to about 120°. At a short distance in advance of the rear cross walls 21 is a radially disposed strike-off bar 23 which is elevated a short distance above the deck surface of the turntable and in position to level down the granular material of a layer of the desired depth.

The cross wall 22 serves to divide the bloating chamber from a soaking chamber 24, the forward end of which is defined by a radial cross wall 25 located about 120° from the cross wall 22.

The cross walls 22 and 25 are elevated above the deck surface sufficiently to permit the bloated layer of material to travel thereunder without interference, and immediately behind the cross wall 22 is located a leveling roller 26 of conical formation, the lower surface of which preferably stands in parallel relation to the surface of the turntable deck, so as to level down the bloated and now plastic material to the desired level as it passes under the cross wall 22 and into the soaking chamber.

Beyond the soaking chamber is located a cutting chamber 27 which lies between the wall 25 and a radial cross wall 28, and between the cross wall 28 and the cross wall 21 is located a transfer chamber 29 which communicates with a roofed over annealing chamber 30 formed by the provision of side walls 31 and 32, which annealing chamber extends outwardly from the main structure in radial relation to the turntable.

Within the cutting chamber 27 is located a rotary cutting disk 33 which is mounted upon a radially disposed bracket arm 34 which is telescopically mounted upon a radially mounted rod 35 centrally pivoted on a pin or post 36, so that the cutting wheel and mountings therefor may rotate to accommodate the cutting wheel to the continuous rotary motion of the turntable upon which the bloated column or slab is carried. Adequate means are provided for rotating the cutting disk 33, but it is not deemed necessary to describe such means in detail.

Within the transfer chamber is located a cam plate or bar 37 which projects outwardly from the inner wall of the chamber and serves to force the severed slabs outwardly toward the annealing chamber and upon an endless conveyor 38 mounted upon rollers 39, which cause the endless conveyor to move at a slow speed through the annealing chamber, which is of sufficient length, in relation to the feeding speed of the conveyor, to permit the slabs of bloated material to become thoroughly annealed before they are finally discharged into the atmosphere at the discharge end of the annealing chamber.

In order to prevent the bloating material from adhering to the deck of the turntable, a chute 40 is located immediately behind the radial cross wall 21 and in position to feed a parting material, such as sand, upon the surface of the turntable, in the form of a thin layer or coating, which underlies the layer of granular material fed downwardly from the preheater.

The bloating chamber is heated to the desired temperature by the provision of suitable heating devices, such as gas burners or the like, which are not illustrated and need not be described in detail, and the remaining chambers leading onwardly to the stack will be adequately heated to the desired lower temperatures in order to maintain the most desirable temperatures throughout the progress of the material through the kiln.

In operation, the material agitated by the rotary kiln and preheated to approximately 1700° F., and while still in granular form and at a temperature slightly below the fusing point, will be fed downwardly through the chute 17 and deposited upon the sand-coated surface of the turntable immediately behind the strike-off bar 23. At this point the granular material will be leveled down to a layer of the desired depth, and will begin its progress through the bloating chamber.

The material will be fed continuously in order to form a continuous layer, which, as it traverses the bloating chamber, will be first seared over the surface and afterwards bloated, so that by the time it reaches the roller 26, near the end of the bloating chamber, it will be in a thoroughly bloated and somewhat plastic condition. At this point it will be leveled down by the roller and will pass under the wall 22 and into the soaking chamber, within which it will soak at a fairly high temperature prior to its emergence into the cutting chamber where it will be cut into blocks of the intended dimensions. Thereafter it will pass to the transfer chamber and be received upon the endless conveyor and carried slowly through the annealing chamber to the point of discharge.

By reason of the ring-shaped configuration of the continuous slab, the sections thereof, as shown, will assume a segmental configuration, but such sections can afterwards be cut to the form of rectangular units of a size and shape resembling bricks, or given any other desired configuration.

If it is desired to produce building units which retain the roughened or pebbled texture of the natural surface produced by bloating, the roller 26 can be omitted, in which case the slab or column will maintain the surface texture imparted to it while in the bloating chamber. Likewise, if it is desired to impart special or peculiar surface textures to the completed slab, a sprinkling of granular material having the desired degree of fineness, or having special color producing properties, may be sprinkled over the surface of the layer deposited within the bloating chamber, but it is not deemed necessary to describe such refinements in further detail.

Although the kiln as shown is divided into a plurality of chambers, which have been respectively referred to as the bloating chamber, the soaking chamber, the cutting chamber, and the transfer chamber, it is not deemed essential in all cases to divide the structure to this extent, since one or more of such chambers may be omitted without substantially altering the general character of the structure as a whole. Thus, for instance, the wall 25 might be eliminated and the so-called cutting chamber merged with the soaking chamber, although it is deemed desirable, in most instances, to cut the material after it has become sufficiently cooled to lose the soft and semi-plastic condition which it assumes during the bloating stage of the operation.

Other modifications and details may be introduced without departing from the spirit of the invention.

We claim:

1. A kiln of the class described, provided with a bloating chamber, a turntable mounted to traverse the bloating chamber and to transport material therethrough and deliver such material, when bloated, beyond the bloating chamber, means within the bloating chamber for feeding a layer of granular material to the surface of the turntable, and an annealing chamber extending outwardly at an angle from the turntable and having a supporting surface flush with the turntable and adapted to receive a slab bloated material outwardly displaced therefrom and subject it to an annealing operation.

2. A kiln of the class described, provided with a bloating chamber, a turntable mounted to traverse the bloating chamber and to transport material therethrough and deliver such material, when bloated, beyond the bloating chamber, an annealing chamber extending outwardly from the turntable and adapted to receive bloated material therefrom and subject it to an annealing operation, and cutting means located in proximate relation to the turntable at a point between the bloating chamber and the annealing chamber for cutting the bloated material into sections.

3. A kiln of the class described, provided with a bloating chamber, a turntable positioned to traverse the bloating chamber and carry granular material therethrough during the bloating operation, an annealing chamber outwardly extending from the main structure and positioned to receive bloated material from the turntable after the material has been carried through the bloating chamber, and an endless conveyor within the annealing chamber, positioned to receive slabs of material from the turntable.

4. A kiln of the class described, provided with inner and outer circular walls and a roof affording a bloating chamber, a circular turntable positioned to traverse the bloating chamber and carry granular material therethrough during the bloating operation, an annealing chamber outwardly extending from the main structure and positioned to receive bloated material from the turntable after the material has been carried through the bloating chamber, an endless conveyor within the annealing chamber, positioned to receive slabs of material from the turntable, cutting means located between the bloating chamber and the annealing chamber and adapted to cut the bloated material into sections, and discharging means coacting with the turntable and in proximate relation to the entrance to the annealing chamber, for forcing severed sections of bloated material from the turntable toward the annealing chamber.

5. A kiln of the class described, provided with inner and outer circular walls and a roof affording a bloating chamber, a circular turntable positioned to traverse the bloating chamber and carry granular material therethrough during the bloating operation, an annealing chamber outwardly extending from the main structure and positioned to receive bloated material from the turntable after the material has been carried through the bloating chamber, cutting means located between the bloating chamber and the annealing chamber and adapted to cut the bloated material into sections, discharging means coacting with the turntable and in proximate relation to the entrance to the annealing chamber, for forcing severed sections of bloated material from the turntable toward the annealing chamber, and an endless conveyor within the annealing chamber, adapted to receive and transport the sections of bloated material forced away from the turntable by the discharging means.

6. A kiln of the class described, provided with a bloating chamber, a turntable mounted to traverse the bloating chamber and to transport material therethrough and deliver such material, when bloated, beyond the bloating chamber, an annealing chamber extending outwardly from the turntable and adapted to receive bloated material and subject it to an annealing operation, and a rotary preheater positioned to discharge preheated granular material onto the turntable for transport through the bloating chamber.

7. A kiln of the class described, provided with a bloating chamber, a turntable mounted to traverse the bloating chamber and to transport material therethrough and deliver such material, when bloated, beyond the bloating chamber, an annealing chamber extending outwardly from the turntable and adapted to receive bloated material therefrom and subject it to an annealing operation, cutting means located in proximate relation to the turntable at a point between the bloating chamber and the annealing chamber for cutting the bloated material into sections, and a rotary preheater positioned to discharge preheated granular material onto the turntable for transport through the bloating chamber.

8. A kiln of the class described, provided with inner and outer circular walls and a roof affording a bloating chamber, a circular turntable positioned to traverse the bloating chamber and carry granular material therethrough during the bloating operation, an annealing chamber outwardly extending from the main structure and positioned to receive bloated material from the turntable after the material has been carried through the bloating chamber, an endless conveyor within the annealing chamber, positioned to receive slabs of material from the turntable, and a rotary preheater positioned to discharge preheated granular material onto the turntable for transport through the bloating chamber.

9. A kiln of the class described, provided with inner and outer circular walls and a roof affording a bloating chamber, a circular turntable positioned to traverse the bloating chamber and carry granular material therethrough during the bloating operation, an annealing chamber outwardly extending from the main structure and positioned to receive bloated material from the turntable after the material has been carried through the bloating chamber, an endless conveyor within the annealing chamber, positioned to receive slabs of material from the turntable, cutting means located between the bloating chamber and the annealing chamber and adapted to cut the bloated material into sections, discharging means coacting with the turntable and in proximate relation to the entrance to the annealing chamber, for forcing severed sections of bloated material from the turntable toward the annealing chamber, and a rotary preheater positioned to discharge preheated granular material onto the turntable for transport through the bloating chamber.

10. A kiln of the class described, provided with inner and outer circular walls and a roof affording a bloating chamber, a circular turntable positioned to traverse the bloating chamber and carry granular material therethrough during the bloating operation, an annealing chamber outwardly extending from the main structure and positioned to receive bloated material from the turntable after the material has been carried through the bloating chamber, an endless conveyor within the annealing chamber, positioned to receive slabs of material from the turntable, cutting means located between the bloating chamber and the annealing chamber and adapted to cut the bloated material into sections, discharging means coacting with the turntable and in proximate relation to the entrance to the annealing chamber, for forcing severed sections of bloated material from the turntable toward the annealing chamber, an endless conveyor within the annealing chamber, adapted to receive and transport the sections of bloated material forced away from the turntable by the discharging means, and a rotary preheater positioned to discharge preheated granular material onto the turntable for transport through the bloating chamber.

11. A kiln of the class described, comprising inner and outer walls, and a roof affording a bloating chamber on its interior, a turntable positioned to present its deck within the bloating chamber, means for depositing granular material upon the exposed deck of the turntable, means beyond the point of deposit for leveling the material so deposited to a layer of the desired depth, means for outwardly displacing a slab of bloated material across the turntable after its emergence from the bloating chamber and means for receiving and conveying the slabs so displaced away from the turntable.

12. A kiln of the class described, comprising circular inner and outer walls and a roof affording a bloating chamber on its interior, a circular turntable positioned to present its deck within the bloating chamber, means for depositing granular material upon the exposed deck of the turntable, means for leveling the material so deposited to a layer of the desired depth, means for permitting removal of bloated material from the turntable after its emergence from the bloating chamber, and a cutting device in proximate relation to the turntable for cutting the bloated material into sections after its emergence from the bloating chamber.

13. A kiln of the class described, comprising inner and outer circular walls and a roof affording a circular tunnel, cross walls for dividing the tunnel-shaped interior into a bloating chamber, a soaking chamber and a transfer chamber, a turntable rotatable through the chambers, means for depositing granular material upon the turntable within the bloating chamber in the form of a layer, and means for permitting removal of the bloated material from the transfer chamber.

14. A kiln of the class described, comprising inner and outer circular walls and a roof affording a circular tunnel, cross walls for dividing the tunnel-shaped interior into a boating chamber, a soaking chamber and a transfer chamber, a turntable rotatable through the chambers, means for depositing granular material upon the turntable within the bloating chamber in the form of a layer, means for depositing a coating of parting material between the surface of the turntable and the granular material, and means for permitting removal of the bloated material from the transfer chamber.

15. A kiln of the class described, comprising inner and outer circular walls and a roof affording a circular tunnel, cross walls for dividing the tunnel-shaped interior into a bloating chamber, a soaking chamber and a transfer chamber, a turntable rotatable through the chambers, means for depositing granular material upon the turntable within the bloating chamber in the form of a layer, and an elongated annealing chamber extending outwardly from the transfer chamber and adapted to receive bloated material from the turntable during its passage through the transfer chamber.

16. A kiln of the class described, comprising inner and outer circular walls and a roof affording a circular tunnel, cross walls for dividing the tunnel-shaped interior into a bloating chamber, a soaking chamber and a transfer chamber, a turntable rotatable through the chambers, means for depositing granular material upon the turntable within the bloating chamber in the form of a layer, means for depositing a coating of parting material between the surface of the turntable and the granular material, and an elongated annealing chamber extending outwardly from the transfer chamber and adapted to receive bloated material from the turntable during its passage through the transfer chamber.

17. In a kiln of the class described, the combination of inner and outer circular walls and a roof affording a circular tunnel, cross walls dividing the tunnel into a bloating chamber, a soaking chamber and a transfer chamber, a circular turntable having a deck surface rotatable beneath the chambers, an annealing chamber outwardly extending from the transfer chamber, a rotary preheater positioned to discharge granular material upon the surface of the turnable within the bloating chamber, a chute for depositing a layer of parting material beneath the granular material, a strike-off for leveling down the surface of the granular material deposited upon the turntable within the bloating chamber, and a cutting device located between the soaking chamber and the point of discharge into the annealing chamber, for severing the material into sections.

18. In a kiln of the class described, the combination of inner and outer circular walls and a roof affording a circular tunnel, cross walls dividing the tunnel into a bloating chamber, a soaking chamber and a transfer chamber, a circular turntable having a deck surface rotatable beneath the chambers, an annealing chamber outwardly extending from the transfer chamber, a rotary preheater positioned to discharge granular material upon the surface of the turntable within the bloating chamber, a chute for depositing a layer of parting material beneath the granular material, a strike-off for leveling down the surface of the granular material deposited upon the turntable within the bloating chamber, a cutting device located between the soaking chamber and the point of discharge into the annealing chamber, for severing the material into sections, and means within the transfer chamber for forcing the severed sections outwardly from the turntable toward the annealing chamber.

19. In a kiln of the class described, the combination of inner and outer circular walls and a roof affording a circular tunnel, cross walls dividing the tunnel into a bloating chamber, a soaking chamber and a transfer chamber, a circular turntable having a deck surface rotatable beneath the chambers, an annealing chamber outwardly extending from the transfer chamber, a rotary preheater positioned to discharge granular material upon the surface of the turntable within the bloating chamber, a chute for depositing a layer of parting material beneath the granular material, a strike-off for leveling down the surface of the granular material deposited upon the turntable within the bloating chamber, a cutting device located between the soaking chamber and the point of discharge into the annealing chamber, for severing the material into sections, means within the transfer chamber for forcing the severed sections outwardly from the turntable toward the annealing chamber, and an endless conveyor within the annealing chamber for receiving such sections and transporting them from the annealing chamber.

20. In a kiln of the class described, the combination of inner and outer circular walls and a roof affording a circular tunnel, cross walls dividing the tunnel into a bloating chamber, a soaking chamber and a transfer chamber, a circular turntable having a deck surface rotatable beneath the chambers, an annealing chamber outwardly extending from the transfer chamber, a rotary preheater positioned to discharge granular material upon the surface of the turntable within the bloating chamber, a chute for depositing a layer of parting material beneath the granular material, a strike-off for leveling down the surface of the granular material deposited upon the turntable within the bloating chamber, a cutting device located between the soaking chamber and the point of discharge into the annealing chamber, for severing the material into sections, means within the transfer chamber for forcing the severed sections outwardly from the turntable toward the annealing chamber, an endless conveyor within the annealing chamber for receiving such sections and transporting them from the annealing chamber, and a leveling roller within the bloating chamber for leveling down the surface of the material when bloated.

In witness that we claim the foregoing we have hereunto set our hands respectively this 3rd day of October, 1929, and this 16th day of October, 1929.

WARNER HATHAWAY.
EDWIN M. WYATT.